Figure 2:
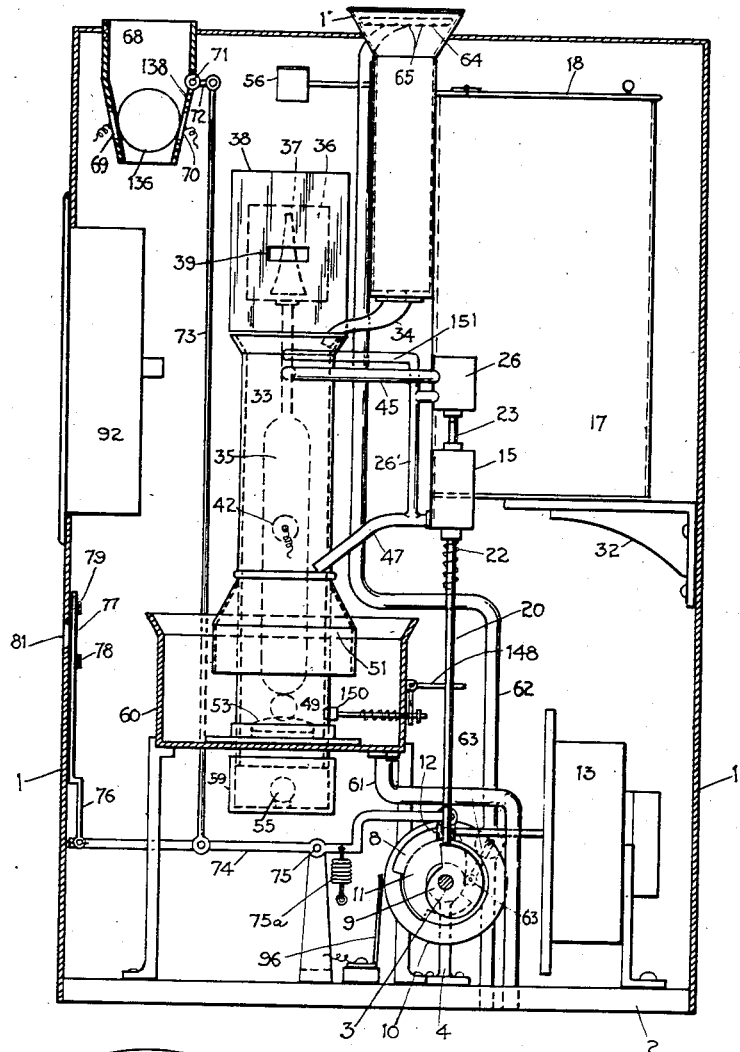

April 13, 1937.  J. P. BUCKLEY  2,077,211
DIAGNOSTIC APPARATUS
Original Filed July 23, 1932  5 Sheets-Sheet 1
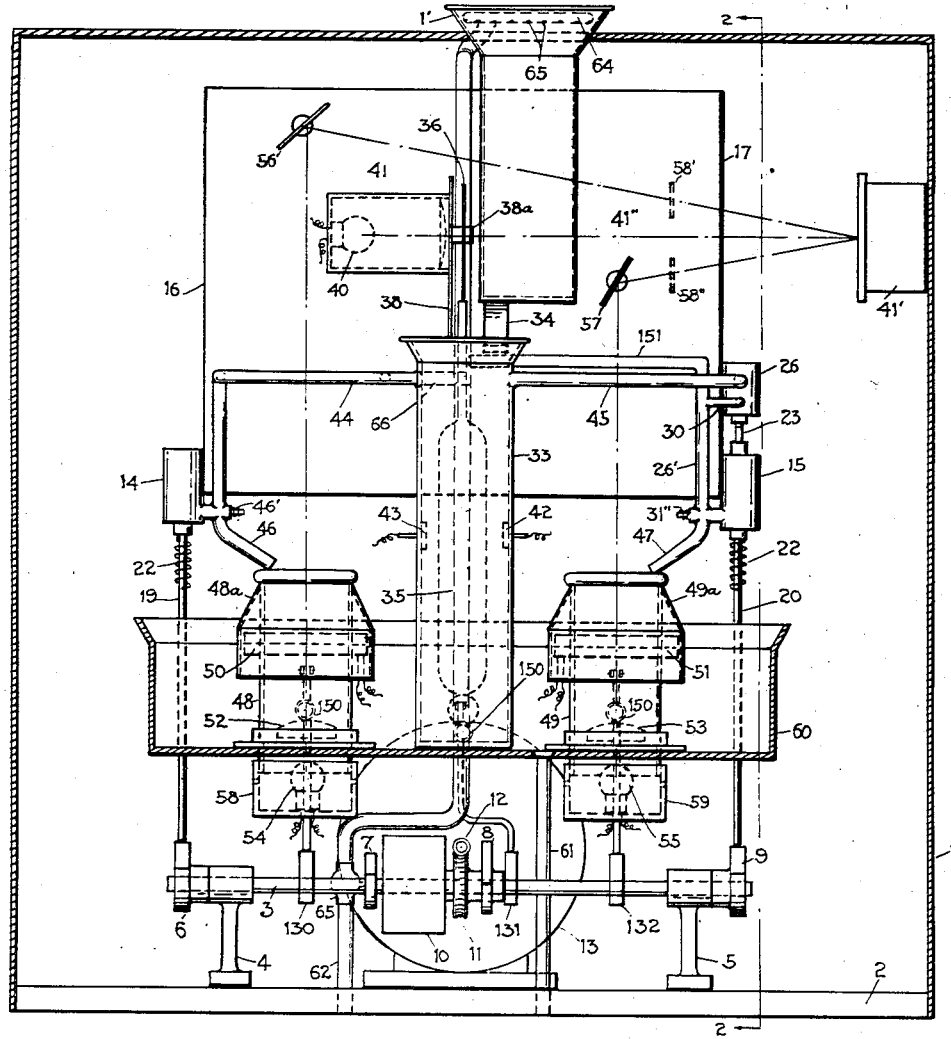
FIG. 1.
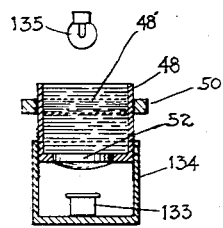
FIG. 9.
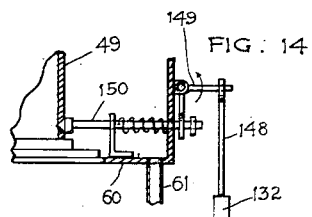
FIG. 14
Inventor
John P. Buckley
John O. Brady
Attorney April 13, 1937.  J. P. BUCKLEY  2,077,211
DIAGNOSTIC APPARATUS
Original Filed July 23, 1932  5 Sheets-Sheet 2

Inventor
John P. Buckley
John B. Grady
Attorney

April 13, 1937.  J. P. BUCKLEY  2,077,211
DIAGNOSTIC APPARATUS
Original Filed July 23, 1932   5 Sheets-Sheet 3

Inventor
John P. Buckley
John B. Brady
Attorney

April 13, 1937.  J. P. BUCKLEY  2,077,211

DIAGNOSTIC APPARATUS

Original Filed July 23, 1932  5 Sheets-Sheet 4

Inventor
John P. Buckley
John B. Brady
Attorney

April 13, 1937.　　　J. P. BUCKLEY　　　2,077,211
DIAGNOSTIC APPARATUS
Original Filed July 23, 1932　　5 Sheets-Sheet 5
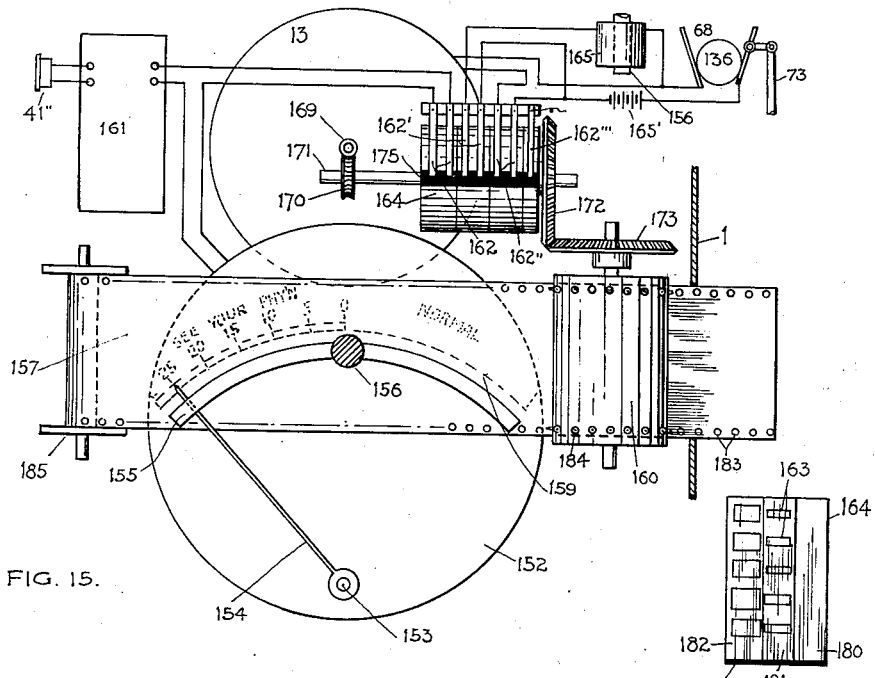
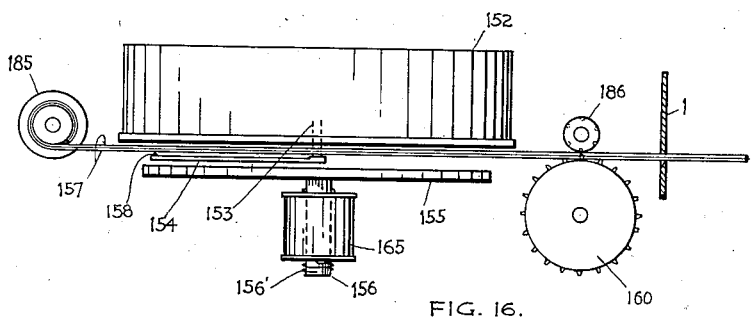
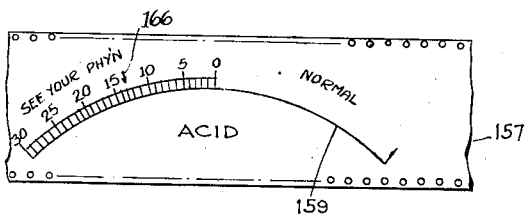
Inventor
John P. Buckley
John B. Grady
Attorney Patented Apr. 13, 1937

2,077,211

UNITED STATES PATENT OFFICE 2,077,211

DIAGNOSTIC APPARATUS

John P. Buckley, Washington, D. C.

Application July 23, 1932, Serial No. 624,270
Renewed October 29, 1935

12 Claims. (Cl. 23—253)

My invention relates broadly to diagnostic apparatus and more particularly to a method and apparatus for automatically determining and recording the condition of the urine.

One of the objects of my invention is to provide an apparatus which will diagnose disease discernible from the condition of the urine.

Another object of my invention is to provide a construction of test apparatus for automatically determining the character of reaction between a fluid under test and a reagent for determining therefrom the original condition of the fluid.

Still another object of my invention is to provide an automatic testing apparatus for fluid having means for electrically indicating the specific gravity of the fluid and the reaction thereof with predetermined reagents.

A further object of my invention is to provide a mechanism operative in cycles to receive and determine the condition of a test fluid with means automatically operative subsequent to the conclusion of the test operation for flushing out the mechanism in a sanitary manner preparatory for a succeeding test observation.

A still further object of my invention is to provide a construction of test apparatus operative by means of coin control mechanism for initiating a cycle of observations in the testing of fluid whose characteristics are to be determined.

Another object of my invention is to provide a fluid test apparatus operative to perform a multiplicity of successive observations upon a test fluid with means for registering the result of each observation and delivering a printed record of such observations.

Still another object of my invention is to provide a control circuit for a fluid testing diagnostic apparatus in which an electron tube is controlled by a light sensitive cell which is acted upon at successive time intervals by light rays controlled by the specific gravity of the fluid under test and the reactions produced by reagents with the fluid under test.

A further object of my invention is to provide an electron tube control circuit operative by a light sensitive cell to control the functioning of a meter connected with the control circuit with connections from the meter for testing the conductivity of a test fluid for indicating the acidity thereof in combination with switching means for cyclically controlling the operation of the circuit for effecting a multiplicity of succeeding observations with respect to the test fluid.

Figure 3:
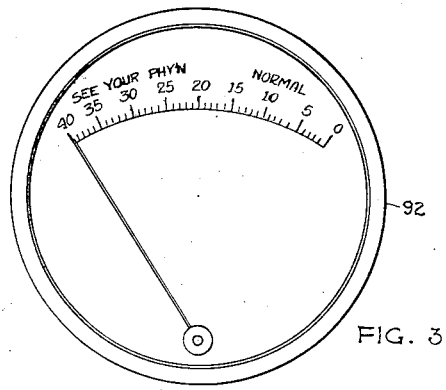
Figures 4, 5, 6, 7, 8:
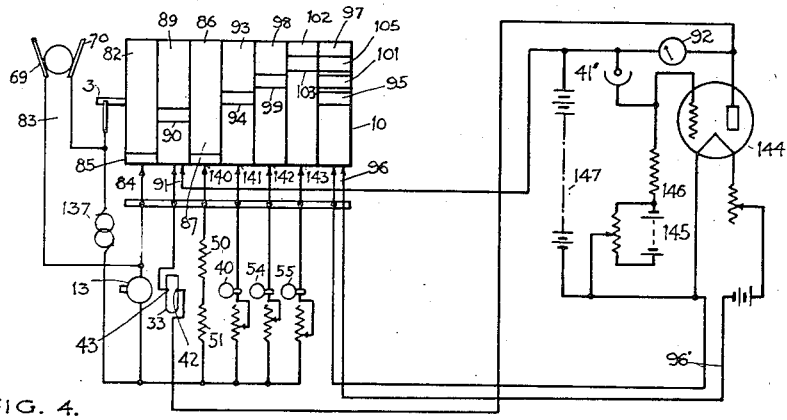
Figure 10:
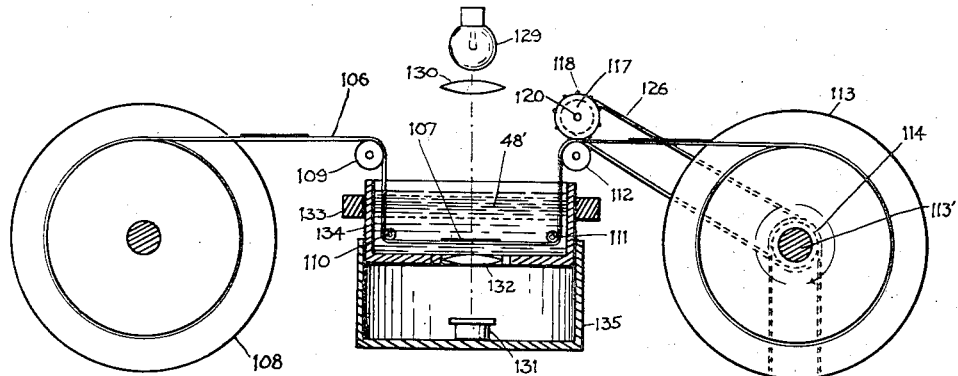
Figure 11:
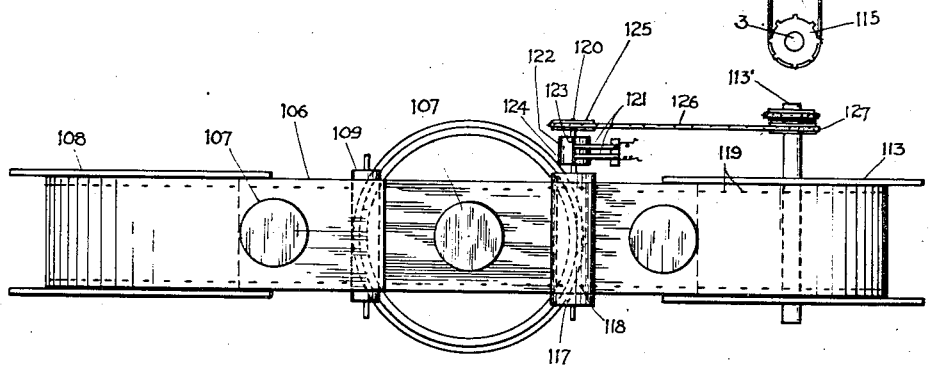
Figure 12:
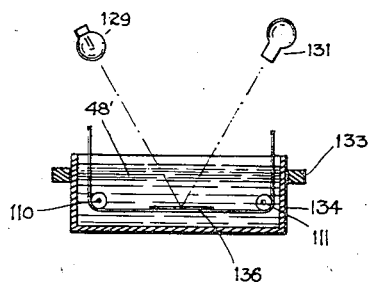
Figure 13:
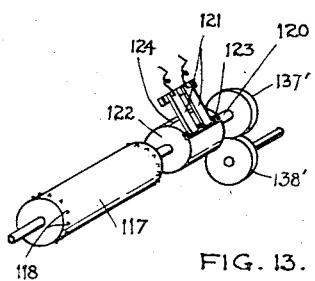

Other and further objects of my invention reside in the method of operation of the diagnostic apparatus of my invention and the structure of the apparatus employed to carry out a multiplicity of tests in cyclic order as will be more fully understood from the specification hereinafter following by reference to the accompanying drawings, wherein:

Figure 1 is a front elevational view of the apparatus of my invention with the casing and parts of the apparatus illustrated in cross-section; Fig. 2 is a sectional view taken on line 2—2 of Fig. 1; Fig. 3 is a front elevational view of the indicating meter employed in the apparatus of my invention; Fig. 4 is a diagrammatic view of the control circuit employed in the apparatus of my invention in association with the switching mechanism which I provide for insuring the cyclic operation of the several tests performed by the apparatus of my invention; Fig. 5 is a detailed view of one of the control cams which is employed for operating the indicator for informing the operator as to the particular test being performed; Fig. 6 is a view of the indicator controlled by the cam mechanism of Fig. 5 for indicating the several tests as they are performed in cyclic order within the apparatus; Fig. 7 is a cross-sectional view through one of the delivery cups employed in the apparatus of my invention for predetermining the relative amounts of test fluid and reagent supplied to a test tube in the apparatus of my invention; Fig. 8 is a detailed view of the cam and valve actuator employed for controlling the flush water subsequent to the several test operations for cleaning the apparatus in a sanitary manner; Fig. 9 is a view of a modified form of optical system employed for electrically determining the nepheloidal, cloudy or turbid characteristic which may be produced by the reagent with the test fluid; Fig. 10 is a side elevation of a modified form of reagent introducing mechanism and illustrating the test tube and optical system in its relation to the reagent introducing mechanism; Fig. 11 is a top plan view of the portion of the apparatus illustrated in Fig. 10; Fig. 12 is a cross-sectional view through the test tube showing a further modified form of optical system which may be employed in determining the reactive condition by means of the rearrangement of light sensitive cell and light source for producing a reflective determination; Fig. 13 is a detailed view indicating the manner in which the light source is controlled at the time that the reagent is introduced into the test fluid by means of the apparatus of Figs. 10 and 11; Fig. 14 is a detailed view of the flushing valves in the test tube illustrating the manner in which sanitary condition of the apparatus may be insured after each observation; Fig. 15 is a plan view of the printing attachment for recording the readings obtained by use of the apparatus of my invention; Fig. 16 is a side elevation of the printing attachment shown in Fig. 15; Fig. 17 is a view of the commutator used for controlling the printing operation; and Fig. 18 is a view of the report card delivered by the printing apparatus subsequent to each test observation.

I have described my invention in certain of its preferred embodiments by detailed reference to the drawings hereinafter. In explaining my invention I have referred to the urine as the fluid under test. However there are chemical applications of the apparatus of my invention in other fields and I desire my invention to be considered in its broadest aspects and as applicable in many fields as set forth in the claims hereinafter following.

The apparatus of my invention is mounted within a casing indicated at 1 supported upon a base structure 2 from which the various elements constituting the apparatus are mounted. A rotatable drive shaft 3 is journaled within suitable standards 4 and 5 extending from base 2. The shaft 3 carries various operating cams which I have indicated in Fig. 1 at 6, 7, 8, 9, 130, 131, and 132 for actuating the several valves employed to control the admission of reagents to the fluid under test and control the operation of the recording apparatus and the flushing operation for cleansing the parts of the apparatus. The mechanism is driven by an induction motor such as an electric clock motor indicated at 13 which drives a shaft carrying worm gear 12 which meshes with the worm wheel 11 carried by shaft 3 for driving shaft 3 through periodic cycles effecting operation of the several instrumentalities which will be explained in more detail hereinafter.

The receiving container for the fluid under test is indicated at 1' connected through discharge spout 34 to the test tube 33. Test tube 33 provides a container for fluid under test delivered from the receiving container 1 and serves as a vessel in which the hydrometer 35 is mounted. The hydrometer 35 carries a shutter 36 on its extremity which is guided by plate 38 having guide members 38a thereon for permitting vertical movement of shutter 36 with respect to slot 39. The shutter 36 has a graduated opening 37 therein which is shaped by the converging walls thereof to coact with slot 39 to allow a varying amount of light to pass from the light source 40 in housing 41 to the photoelectric cell in the axially aligned casing 41' along a beam indicated at 41''. The amount of light incident upon the photoelectric cell in casing 41' is directly proportional to the movement of the shutter 36 controlled by the position of the hydrometer 35 in the fluid under test in test tube 33. The amount of light incident upon the photoelectric cell in housing 41' is, therefore, proportional to the specific gravity of the fluid under test in test tube 33.

In order to determine the acidity of the fluid under test, I provide two electrodes 42 and 43 of dissimilar metals, one of which is electropositive and one of which is electromagnetic in the electrolyte constituted by the fluid under test. The electrodes 42 and 43 are mounted in the side walls of the test tube which are electrically connected in the test circuit as represented more clearly in Fig. 4, for indicating on meter 92 the electromotive force across electrodes 42 and 43. The test tube 33 is mounted centrally with respect to the apparatus and is connected through overflow tubes 44 and 45 leading from the sides of the test tube 33 to nozzles 46 and indirectly through reservoir 26 (Fig. 7) and overflow tube 26' to nozzle 47 which direct the fluid under test into two symmetrically arranged smaller test tubes 48 and 49. Surrounding the smaller test tubes, I provide heating coils 50 and 51 arranged to be connected in a heating circuit at a predetermined time interval in the cycle of operation of the apparatus. The bottom of each of the test tubes 48 and 49 is provided with lenses 52 and 53 and beneath these lenses I provide light sources 54 and 55 disposed in alignment with lenses 52 and 53 by means of housings 58 and 59. The light sources 54 and 55 are disposed in axial alignment with reflecting mirrors 56 and 57 with the lenses 52 and 53 and the fluid in test tubes 48 and 49 interposed in the optical path therebetween. The mirrors 56 and 57 are supported on adjustable brackets which extend from the reservoirs 16 and 17 which provide a mounting means for the electron tube apparatus employed in the test system of my invention. The reservoirs 16 and 17 are mounted with respect to the casing 1 by suitable brackets 32 as illustrated more clearly in Fig. 2. The mirrors 56 and 57 are angularly adjusted to reflect the light beam transmitted through the fluid in test tubes 48 and 49 to the photoelectric cell in housing 41'. In lieu of the arrangement of the photoelectric cell in the position shown, I may provide individual photoelectric cells at 133 beneath each of lens 52 and 53 in lieu of the light sources 54 and 55 as shown in the modified form illustrated in Fig. 9. In this instance the test tube 48 is formed from material which may be screwthreaded on its exterior to receive the screw threads on the interior of cap member 134, which is adjustable to move the photoelectric cell 133 to a position coinciding with the focal point of lens 52. In this arrangement a light source 135 is arranged over each test tube 48 and 49 for directing rays of light through the fluid in test tube 48, lens 52 and upon photoelectric cell 133.

Any overflow which may occur from test tubes 48 and 49 is deflected by means of deflecting protective collars 48a and 49a placed over the tube of each of the test tubes 48 and 49 for directing the overflow fluid into the basin 60. Basin 60 has a discharge orifice and pipe connection 61 connected therewith for discharging the overflow fluid.

The reagent which is added to the fluid under test in each of the test tubes 48 and 49 is introduced into the fluid under test by any one of several methods. In Fig. 1 I have illustrated apparatus for introducing the reagent to the fluid under test by effecting the discharge of the reagent from reservoirs 14 and 15. Any suitable reagent may be employed to effect the reaction with the fluid under test to produce a nepheloid characteristic or a cloudy or turbid effect 43' for occluding the passage of light in the optical system provided through the test tubes. The reservoirs 14 and 15 contain reagents of different characteristics for producing different reactionary effects with the fluid under test for obtaining readings of different characteristics. The determination of the character of the test is indicated to the observer from the front of the apparatus housed within casing 1 by observing indicator 77 through aperture 81 in casing 1. Indicator 80 on observing indicator 77 is moved behind apparatus 81 and are made visible to the observer from the front of the apparatus in the cyclic order in which the tests are automatically performed by the apparatus. These indications may be of various characteristics as illustrated by way of example in Fig. 6 where the character of the tests performed may be read as "acid-alkali", "specific gravity", "albumen" and "sugar".

The movement of the observing indicator is controlled by actuating rod 76 connected with lever 74 pivoted at 75 and tensioned by means of spring 75a so that the end of lever 74 is normally engaged by cam 8 on shaft 3. The movement of the observing indicator 77 is directly controlled by coin control mechanism by which the functioning of the apparatus is governed. The coin control mechanism is shown as including coin slot 68 through which coin 136 may be introduced to form a closed circuit through contact 69 and 70, serving to set the mechanism in operation by closing the circuit between source of potential indicated at 137 and the driving motor 13. The right hand portion 138 of the coin mechanism is pivoted at 71 and connected through bell crank 72 with rod 73 which is pivotally connected to lever 74 controllable by cam 8. As the lever 74 is moved to its extreme lower position at the end of the limit of travel of cam 8 and bringing the last characteristic reading into observation through aperture 81, the coin 136 is released and the mechanism thus prepared for the next succeeding operation.

Shaft 3 opens the reagent dispensing apparatus through the operation of cams 6 and 9. Valve actuating rods 19 and 20 have their lower ends continuously urged into contact with cams 6 and 9 through springs 22 which normally tend to close the valves which admit the reagents to the test tubes 48 and 49.

The test performed on the fluid in test tube 49 differs from the test on the fluid in test tube 48 and, for this reason, the proportion of the fluid and reagent necessarily differs. In order to make provision for the introduction into the test tube 49 of the precise quantity of fluid and reagent, I provide a measuring cup 26 connected through overflow tube 45 with central test tube 33 as shown. As the fluid overflows through tube 45, measuring cup 26 is filled. Cup 26 has a horizontally extending bottom partition 26a therein normally closed by a valve 25. Valve 25 is closed by means of valve rod 23 which passes through the lower chamber 26b. A coil spring 24 is provided for normally urging the valve 25 closed with respect to the valve seat in partition 26a of measuring cup 26. Pressure is applied to spring 24 through piston member 21 operative in cylinder 27. The coil spring 22 which is secured to valve rod 20 normally tends to urge piston 21 to the lowermost position in cylinder 27, allowing valve 25 to open and deliver a predetermined quantity of test fluid through discharge pipe 30 and spout 47 to test tube 49.

As cam 9 on shaft 3 is revolved by motor 13, rod 20 is raised, thereby moving piston 21 from a position normally closing port 29 in reagent tank 17 to the position illustrated in Fig. 7, in which the reagent may flow into the lower portion of cylinder 27. The lower part of cylinder 27 is closed by a valve 31' disposed on a horizontal axis in pipe line 31 and normally urged to closed position by coil spring 31". As cam 9 is displaced angularly and rod 20 is allowed to move downwardly under the influence of coil spring 22, the reagent in cylinder 27 is forced against valve 31' displacing valve 31' and allowing the reagent to be forced out through pipe 31 and spout 47 and into the test tube 49 in predetermined amount. While the reagent is being forced out of measuring cylinder 27 the inlet port 29 from the reagent tank 17 is closed. It will be observed that a measured quantity of reagent and a measured quantity of test fluid is delivered to test tube 49 for performing the optical test from the light source 55 to the light sensitive cell 41' to determine the extent of reaction in the solution. As heretofore stated, the arrangement of light source and light sensitive cell may be reversed as shown in Fig. 9.

The reagent supplied by tank 17 to measuring cup 27 may be Benedicts solution for performing a test for sugar. Other reagents may be used. In the test tube 48 the reagent is supplied from measuring cup 14 from reagent reservoir 16 under control of a valve actuated by rod 19 under control of cam 6. The reagent may be acetic acid and water for effecting a test for albumen. The manner of operation of the valve 46' in the line leading to spout 46 is similar to the operation explained in connection with valve 31".

A measuring cup similar to cup 26 may be provided above the cup 14 for receiving water or other solution from an additional reservoir adjacent the reagent reservoirs 16 and 17 for delivery to test tube 48 for securing a reaction with the test fluid.

The insertion of a coin in slot 68 closes the electrical circuit to motor 13 from source 137, thus initiating movement of the commutator drum 10 through the circuit arrangement illustrated more clearly in Fig. 4. The drum 10 carries contact segments 82, 90, 87, 94, 99, 103, 105, 101 and 95 on adjacent insulated cylindrical portions of the drum, which portions I have indicated at 89, 86, 93, 98, 102, and 97. Sets of contacts are arranged adjacent the aforesaid cylindrical portions adapted to make sliding contact with the contact segments in successive order. I have indicated insulated parts in each of the cylindrical portions at 85, 89, 86, 93, 98, 102, and 97. The sets of contacts lead to different circuit elements, which contacts are slidably engaged peripherally with respect to the insulation parts and contact segments, heretofore described. That is, the conductive parts of the drum are the ring portions 82, 90, 87, 94, 99, 103, 95, 101 and 105, broken by suitable insulated parts 85, 86, 89, 93, 98, 102 and 97.

The electron tube 144 has light sensitive cell 41' connected in its control circuit with biasing means 145 arranged to place the desired bias potential on the control grid through resistor 146. The output circuit of control tube 144 includes the meter 92 and source of potential 147. The circuit leading to the cathode of tube 144 is closed through leads 96' leading to contacts 96 through the conductive portions 95, 101, and 105 of the drum 10. Electrical connection is established through contacts 42 and 43, which are electropositive and electronegative with respect to each other in the central test tube 33 through the set of contacts 91, which connect to opposite terminals of meter 92. Contact 140 connects the heater coils 50 and 51 with the source of potential 137 for heating the test tubes 48 and 49 at the proper time interval. The light sources 40, 54 and 55 are energized at succeeding time intervals through contacts 141, 142, and 143. It will be observed that these lamps are not put on simultaneously but successively so that different tests are performed at different time intervals as the drum 10 continues to revolve. The drum, when completely revolved at the conclusion of the several tests cuts off the circuit to the cathode and the circuit to the motor, at which time cam 7, as shown in Fig. 8, has moved to a position where flush valve 63 is opened admitting flush water to the pipe 62, which water is distributed from head 64 through spray apertures 65. At the same time cams 130, 132 and 131 on shaft 3 actuate valve rods 148 for controlling bell cranks 149 and opening valves 150 in each of the test tubes 33, 48 and 49, permitting flushing water introduced through spray apertures 65 to flood downwardly through the apparatus and out through discharge valves 150. The flushing operation may be traced through receptacle 1', spout 34, through central test tube 33, discharge valve 150 to trough 60 through which the water is discharged through waste pipe 61 to a sewerage connection. The water floods through tubes 44, 45, 151, the water passing through discharge spout 46 into test tube 48 and discharging through valve 150 for cleaning test tube 48 and passing into discharge trough 60. Water passes through pipes 151 and 45 cleaning cup 26 and discharging through spout 47 to test tube 49 and discharge valve 150 to trough 60 through which it wastes through discharge pipe 61.

The reel and web mechanism, for controlling the dry process of introducing the reagent, is illustrated in side view in Fig. 10 and in top plan view in Fig. 11 showing the reagent in dry form as embossed or printed on a transparent tape which is introduced into the liquid to be tested. Fig. 12 shows how the light sensitive cell may be sensitized by reflected light. Fig. 13 illustrates the manner in which the tape may be arrested momentarily when the reagent is centered in the test tube as shown by the employment of guide rollers.

The tape 106, bearing the reagent 107 deposited in charges at spaced intervals, is mounted on spool 108 and is made to pass over roller 109 downward to roller 110, thence to roller 111 and around roller 112 to motor driven spool 113 on shaft 113' and wound thereon through sprocket wheels 114 and 115 by means of connecting chain 116. The shaft 3 supporting the driving sprocket 115 is operated by induction motor 13 shown in Figs. 1 and 2. Meshing with roller 112 is sprocket roller 117 whose teeth 118 are made to engage the perforations 119 of the tape 106 for the purpose of moving the tape from spool 108. Adjacent to the roller 117, supported on shaft 120, are brushes 121 contacting with commutator 122, peripherally supporting insulation block 123 and metallic block 124. Sprocket 125 on shaft 120 is engaged by chain 126 operably associated with sprocket 127 on shaft 113', the arrangement operating to advance the tape 106 a predetermined distance. That is to say, the reagent is deposited in charges on the tape 106 at such distances as will equal one revolution of the sprocket roller 117 when the shaft 3 effects a complete revolution thus centering, when properly adjusted, a charge of the reagent in the center of the test cup 134.

The lamp 129 and the lens 130 serve as an optical system for directing light rays on the light sensitive cell 131, through lens 132. The heating coil 133 similar to coils 50 and 51, shown in Figs. 1 and 2, surround the test cup 134. Adjustable casing 135 which houses light sensitive cell 131 is screw threaded upon the lower portion of test cup 134 as shown.

Fig. 12 shows the light sensitive cell 131 and the lamp 129 arranged in a modified optical system above the tape, the light sensitive cell being energized by light reflected from a mirrored spot such as a spot of aluminum paint, or otherwise, over which the reagent may be previously printed on the tape. The reagent on entering the test liquid dissolves and exposes the mirrored spot beneath, designated by the numeral 136, thereby serving as a reflector. The turbid, cloudy solution effect or nepheloid characteristic indicated at 48', when it appears, obstructs the amount of light reflected to the light sensitive cell thereby correspondingly controlling the operation of the meter 92.

Fig. 13 shows the commutator 122 carrying insulation block 123 and metallic block 124 in contacting engagement with brushes 121, which brushes control the motor circuit through segment 82 shown in Fig. 4. The metallic block 124 serves to energize the lamp 129 in timed relation to the centering of the reagent 107 in the test cup 134. The gears 137' and 138' drive the commutator 122. The gears 137' and 138' are mutilated at a portion of their periphery to provide a momentary pause of the driven gear 137' occurring when the reagent reaches the center of the cup 134, at the instant of the lamp 129 being energized by the contact 122.

Another modified form of my invention includes registering meter 152, by which a permanent record of the test may be kept. Fig. 15 shows meter 152 having an extended shaft 153 to which is attached indicating needle 154. Interposed between the face of the meter and the elongated head 155, and operably associated with the armature 156 and free to be moved laterally, I provide a reel and web mechanism including a carbon backed tape 157. The indicating needle 154 carries at its upper end a projecting type pallet 158. The movement of the type pallet 158 describes an arc which covers the preprinted scale 159 on the tape 157 when such tape movement is centered with respect to shaft 153 by the roller 160. At a predetermined time, as the indicating needle 154 is influenced by the light sensitive cell 41' in the input circuit of amplifier 161, and the brushes 162' contact with metallic block 163, shown more clearly in Fig. 17 of the commutator 164, the electromagnet 165 becomes energized through source 165' causing the armature 156, carrying the elongated head 155 to be forced forward in opposition to spring 156'.

This forward stroke of the head 155 strikes the indicating needle 154 carrying the type pallet 158. The purpose of the elongated head is to encompass the entire scale range of the indicating needle 154 so as to obtain an impress from the type pallet 158 of indicating needle 154 through the carbon back of the tape to provide a permanent mark through the tape, as shown at point 166 in Fig. 18. The predetermined travel of the tape is accomplished by a reel and web mechanism similar to that shown in Figs. 10 and 11. The sprocket roller 160 is controlled by motor 13 through worm 169, gear 170 on shaft 171, gear 172 and gear 173. Fixed on shaft 171 is the commutator 164 having insulation block 175, contacting with brushes 162, 162', and 162''. Brush 162''' is not connected but indicates a continuation of the brush system. Brush 162'' controls the motor circuit, as heretofore described, through coin 136 deposited in slot 68. Brush 162" controls the electromagnet 165 in connection with conductive contact segments 181. The meter 152 is controlled by brushes 162 in contacting with conductive contact segments 182 during the test period. The tape is advanced by teeth 184 on the sprocket roller 160 fitting into perforations 183 in the tape 157. The tape is mounted on roller 185 and drawn forward by sprocket roller 160 and cooperative roller 186.

The advancement of the tape is effected in timed relation to the several tests which are performed, so that a separate record card is delivered to the operator in a form shown in Fig. 18. The card has a scale, the first portion of which reads "Normal". Any movement of the indicating needle over this scale range under influence of the light sensitive cell will not indicate any abnormal condition of the test fluid. The movement of the indicator in the normal range indicates that the reaction between the reagent and the test fluid does not produce a turbid, cloudy or nepheloidal characteristic of an abnormal nature. The condition of the health may, therefore, be diagnosed. However, where a dangerous condition exists, the indicating needle moves over a scale range at 159 entitled "See your physician", by reason of the action of the light sensitive cell in the optical system, due to the reflecting or obstruction of light rays with respect to the turbid, cloudy or nepheloidal characteristic produced by the reaction between the reagent and the test fluid. The scale of meter 92 in Fig. 3 is similarly calibrated, except that the scale divisions may be continuous from "Normal" through the scale range "See your physician".

The proper time relation for the production of heat from coils 50—51 or 133 is essential in carrying out the method of my invention as heating is necessary to the production of the albumen and sugar tests of the test fluid. While the optical paths have been indicated as reflected from the reflectors 56 and 57, other means may be employed for directing the light beams. I provide screens 58' and 58" in the optical paths to the light sensitive cell 41' in order that a predetermined light intensity may be impressed upon the light sensitive cell 41'.

The method and structure of the apparatus as described herein, is to be considered as illustrative of one method and structure for carrying out the method of my invention and is not intended in the limiting sense, as I am aware that my invention may be embodied in modified methods and various structures may be employed in carrying out my invention. I intend no limitation upon my invention other than are imposed by the scope of the appended claims.

What I claim as new and desire to secure by Letters Patent of the United States is as follows:

1. An apparatus for testing the specific gravity of fluid comprising a receptacle for receiving a quantity of the fluid to be tested, a hydrometer in said receptacle displaceable by the fluid under test, an indicator carried by said hydrometer and movable with respect to a light aperture, a light source on one side of said light aperture, a light sensitive cell on the other side of said light aperture, an electrically actuated indicator operated by said light sensitive cell, said first mentioned indicator operating to variably expose said light sensitive cell to the effects of said light source according to the displacement of said hydrometer for correspondingly indicating the specific gravity of said fluid on said second mentioned indicator.

2. In an apparatus of the class described, an electron tube circuit, a light sensitive cell connected to control the operation of said electron tube circuit, an indicating meter controlled by said electron tube circuit, a plurality of test tubes for receiving fluid under test, light sources adjacent each of said test tubes and disposed in an optical path with respect to said light sensitive cell, electrical means for applying heat to each of said test tubes, means for depositing measured quantities of reagent in said test tubes, and switching means for selectively energizing said light sources in succession for taking observations of the character of the fluid in each of said test tubes in successive order.

3. In an apparatus of the class described, an electron tube circuit, a light sensitive cell connected with said circuit, an indicating meter connected with said electron tube circuit, a plurality of test tubes for receiving fluid under test in combination with a reagent of predetermined characteristic, light sources individual to each of said test tubes for directing light rays through the fluid under test subsequent to the reaction thereof with the reagent, electrical means for heating each of said test tubes, and switching means for selectively energizing the light sources in succession for effecting independent readings of said meter under control of the light rays incident upon the combined test fluid and reagent.

4. In an apparatus of the class described, a successively refillable receptacle, means for moving a tape through a test fluid in said receptacle, successive charges of reagent disposed at spaced intervals along said tape, said means for operating said first mentioned means simultaneously with a flushing operation in the receptacle preparatory to a refilling of the receptacle with the test fluid for effecting a chemical reaction with the test fluid, and optical and electrical means for determining the character of the reaction thus produced.

5. In an apparatus of the class described, a receptacle for receiving a test fluid, a driving motor, rotary mechanism operated by said motor, means actuated by said rotary mechanism for introducing a measured quantity of test fluid into said receptacle, means actuated by said rotary mechanism for introducing a measured quantity of reagent into said receptacle, means controlled by said rotary mechanism for effecting an optical and electrical observation of the character of the reaction produced in said test tube, a valve in the base of said test tube, means actuated by said rotary mechanism for opening said valve and effecting a discharge of the solution therefrom, and means controlled by said rotary mechanism for subjecting said test tube to the flow of cleaning medium subsequent to each test operation.

6. An apparatus of the class described, a central test tube, at least two auxiliary test tubes connected with said central test tube and adapted to receive measured quantities of test fluid overflowing from said central test tube, means for introducing measured quantities of reagent into said auxiliary test tubes, means for optically and electrically determining the character of the reaction in said auxiliary test tubes, means for discharging the solution from all of said test tubes, and means operative subsequent to the discharge of the solution from said test tubes for flowing cleaning fluid through said central test tube and through each of said auxiliary test tubes preparatory to a succeeding test operation.

7. In an apparatus of the class described, a coin controlled mechanism, rotary driving mechanism adapted to be initiated in motion for a predetermined time interval under control of said coin control mechanism, a plurality of test tubes, means actuated by said rotary driving mechanism for delivering measured quantities of test fluid to said test tubes, separate means controlled by said driving mechanism for delivering predetermined amounts of reagent to said test tubes, means for effecting different tests on the solution thus produced, an indicator actuated by said driving mechanism for visually indicating the character of each test, and means for making a printed record of the results of each test.

8. In an apparatus of the class described, a light sensitive cell, an indicating meter controlled by said light sensitive cell, a plurality of test tubes for receiving fluid under test, a light source adjacent each of said test tubes and disposed in an optical path with respect to said light sensitive cell, means for heating each of said test tubes, means for introducing measured quantities of reagent in each of said test tubes, and means for selectively energizing said light sources in succession for taking observations of the character of the fluid in each of the test tubes in successive order.

9. In an apparatus of the class described, a receptacle for receiving a test fluid, a driving motor, rotary mechanism operated by said motor, means actuated by said rotary mechanism for introducing a measured quantity of test fluid into said receptacle, means actuated by said rotary mechanism for introducing a measured quantity of reagent into said receptacle, means controlled by said rotary mechanism for effecting an optical and electrical observation of the character of the reaction produced in said test tube, means operated by said rotary mechanism for effecting a discharge of the solution from said test tube, and means controlled by said rotary mechanism for flushing said test tube subsequent to each test operation.

10. In an apparatus of the class described, a testing vessel, at least two auxiliary test tubes connected with said testing vessel, and adapted to receive measured quantities of test fluid overflowing from said testing vessel, means for introducing measured quantities of reagent into said auxiliary test tubes, means for optically and electrically determining the character of the reaction in said auxiliary test tubes, means for discharging the solution from all of said test tubes, and means operative subsequent to the discharge of the solution from said test tubes for flowing cleansing fluid through said testing vessel and through each of said auxiliary test tubes preparatory to a succeeding test operation.

11. In an apparatus of the class described, a coin controlled mechanism, rotary driving mechanism adapted to be initiated in motion for a predetermined time interval under control of said coin controlled mechanism, a plurality of test tubes, means actuated by said rotary driving mechanism for delivering measured quantities of test fluid to said test tubes, separate means controlled by said driving mechanism for delivering predetermined amounts of reagent to said test tubes, means for effecting different tests on the solution thus produced, and an indicator actuated by said driving mechanism for visually indicating the character of each test.

12. In an apparatus of the class described, a light sensitive cell, an indicating meter controlled by said light sensitive cell, a plurality of test tubes for receiving fluid under test, a light source for projecting rays of light through each test tube in an optical path with respect to said light sensitive cell, means for heating each of said test tubes, means for introducing measured quantities of reagent in each of said test tubes, and means for energizing said light source for taking observations of the character of the fluid in each of the test tubes.

JOHN P. BUCKLEY.